US009159324B2

(12) United States Patent
Grokop et al.

(10) Patent No.: US 9,159,324 B2
(45) Date of Patent: Oct. 13, 2015

(54) IDENTIFYING PEOPLE THAT ARE PROXIMATE TO A MOBILE DEVICE USER VIA SOCIAL GRAPHS, SPEECH MODELS, AND USER CONTEXT

(75) Inventors: Leonard Henry Grokop, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 13/344,726

(22) Filed: Jan. 6, 2012

(65) Prior Publication Data

US 2013/0006634 A1 Jan. 3, 2013

Related U.S. Application Data

(60) Provisional application No. 61/504,084, filed on Jul. 1, 2011.

(51) Int. Cl.
*G10L 15/00* (2013.01)
*G10L 17/00* (2013.01)
*G10L 17/10* (2013.01)
*G10L 17/04* (2013.01)

(52) U.S. Cl.
CPC *G10L 17/10* (2013.01); *G10L 17/04* (2013.01)

(58) Field of Classification Search
CPC ....... G10L 17/00; G10L 17/005; G10L 17/10; G10L 17/16; G10L 17/18; G10L 17/22; G10L 17/26
USPC .......................................... 704/246
See application file for complete search history.

(56) References Cited

U.S. PATENT DOCUMENTS

| | | | |
|---|---|---|---|
| 6,754,631 B1 * | 6/2004 | Din | 704/270 |
| 8,412,512 B1 * | 4/2013 | Wren et al. | 704/3 |
| 8,571,865 B1 * | 10/2013 | Hewinson | 704/236 |
| 2003/0081749 A1 * | 5/2003 | Berstis | 379/202.01 |
| 2007/0198257 A1 | 8/2007 | Zhang et al. | |
| 2008/0082332 A1 * | 4/2008 | Mallett et al. | 704/250 |
| 2009/0177744 A1 | 7/2009 | Marlow et al. | |

(Continued)

FOREIGN PATENT DOCUMENTS

| | | |
|---|---|---|
| CN | 1462366 A | 12/2003 |
| JP | H0888692 A | 4/1996 |

(Continued)

OTHER PUBLICATIONS

International Search Report and Written Opinion—PCT/US2012/044723—ISA/EPO—Oct. 5, 2012.

*Primary Examiner* — Eric Yen
(74) *Attorney, Agent, or Firm* — Kilpatrick Townsend Stockton LLP

(57) ABSTRACT

Techniques are provided to improve identification of a person using speaker recognition. In one embodiment, a unique social graph may be associated with each of a plurality of defined contexts. The social graph may indicate speakers likely to be present in a particular context. Thus, an audio signal including a speech signal may be collected and processed. A context may be inferred, and a corresponding social graph may be identified. A set of potential speakers may be determined based on the social graph. The processed signal may then be compared to a restricted set of speech models, each speech model being associated with a potential speaker. By limiting the set of potential speakers, speakers may be more accurately identified.

33 Claims, 6 Drawing Sheets

(56) References Cited

U.S. PATENT DOCUMENTS

| | | |
|---|---|---|
| 2010/0076968 A1 | 3/2010 | Boyns et al. |
| 2010/0198633 A1 | 8/2010 | Guy et al. |
| 2010/0299615 A1 | 11/2010 | Miluzzo et al. |
| 2010/0325218 A1 | 12/2010 | Castro et al. |
| 2011/0022388 A1* | 1/2011 | Wu et al. ........................ 704/246 |
| 2011/0107405 A1 | 5/2011 | Kisters |
| 2012/0053935 A1* | 3/2012 | Malegaonkar et al. ....... 704/235 |
| 2012/0278824 A1* | 11/2012 | Patil et al. ........................ 725/13 |

FOREIGN PATENT DOCUMENTS

| | | |
|---|---|---|
| JP | 2011523726 A | 8/2011 |
| JP | 2013500538 A | 1/2013 |
| JP | 2013501978 A | 1/2013 |
| KR | 20080102373 A | 11/2008 |
| WO | 2011017653 A1 | 2/2011 |
| WO | WO-2011014292 A1 | 2/2011 |

* cited by examiner

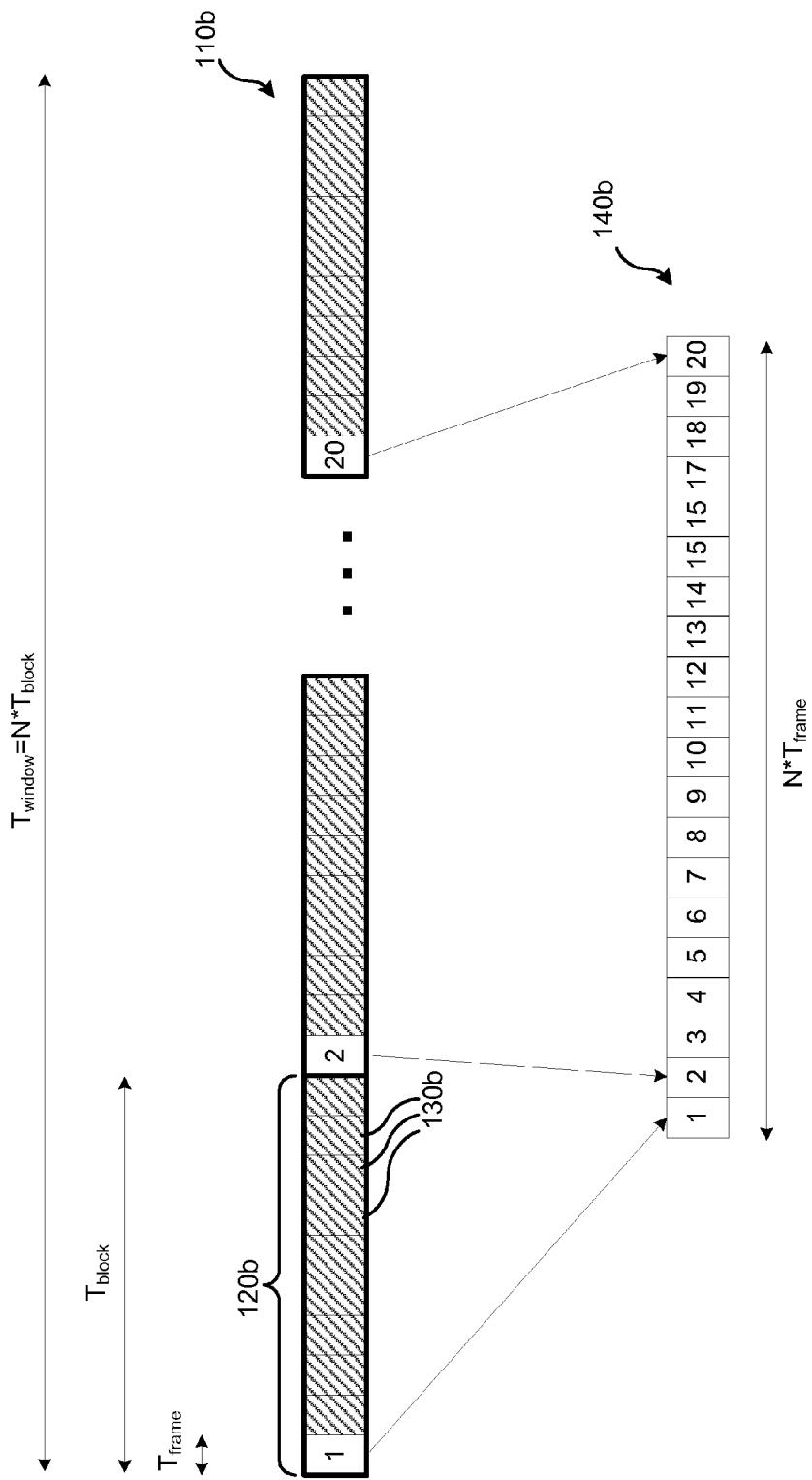

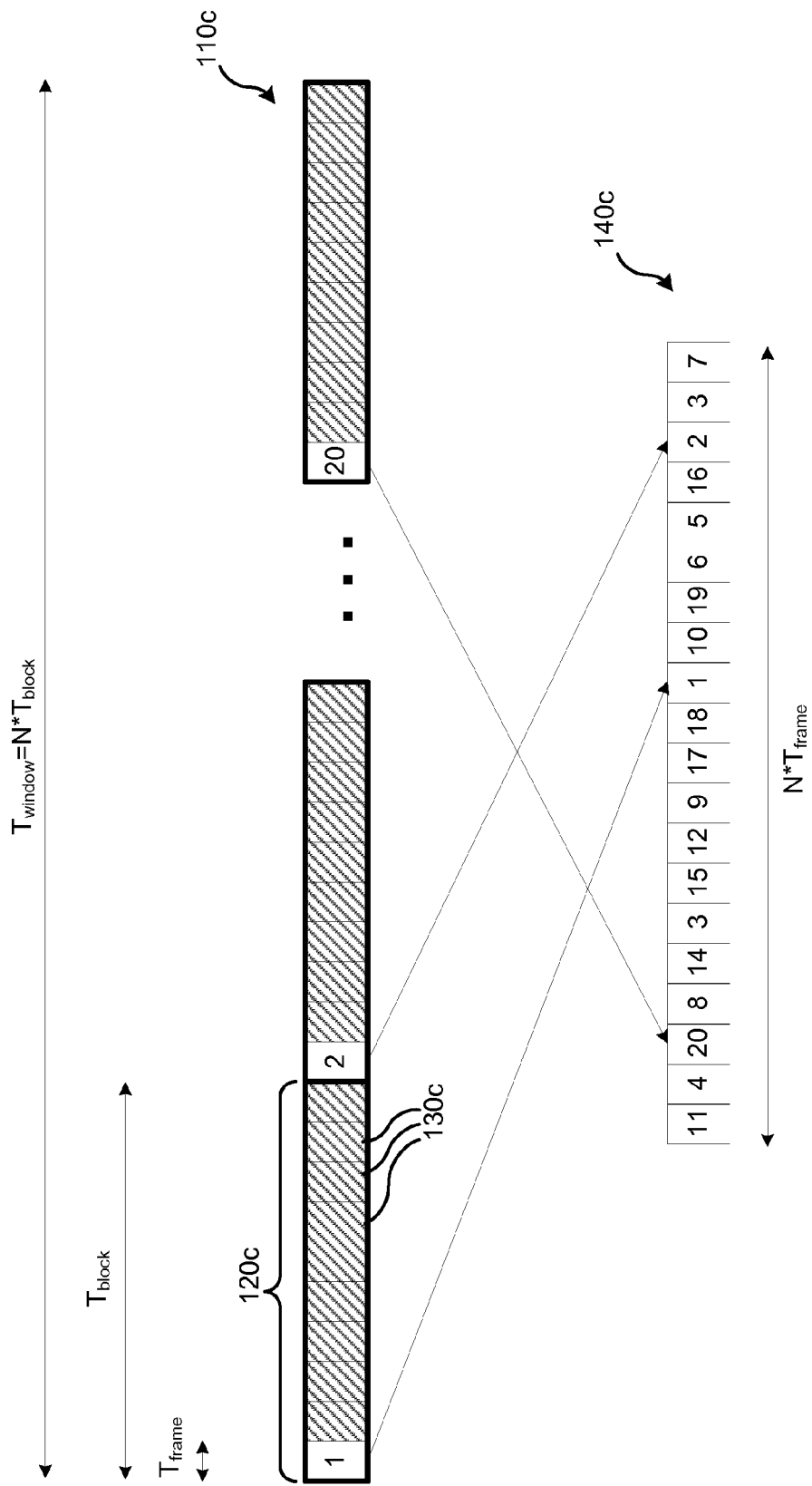

IDENTIFYING PEOPLE THAT ARE PROXIMATE TO A MOBILE DEVICE USER VIA SOCIAL GRAPHS, SPEECH MODELS, AND USER CONTEXT

CROSS-REFERENCES TO RELATED APPLICATIONS

The present application is a non-provisional patent application, claiming the benefit of priority of U.S. Provisional Application No. 61/504,084, filed on Jul. 1, 2011, entitled, "IDENTIFYING PEOPLE THAT ARE PROXIMATE TO A MOBILE DEVICE USER VIA SOCIAL GRAPHS, SPEECH MODELS AND USER CONTEXT," which is hereby incorporated by reference in its entirety.

BACKGROUND

Identifying those people that a mobile device user is interacting with is an extremely valuable problem to be solved in the fields of context awareness and social networking To date, the problem remains largely unsolved.

SUMMARY

Techniques are provided to improve identification of a person using speaker recognition. In one embodiment, a unique social graph may be generated and associated with each of a plurality of defined contexts. The social graph may indicate speakers likely to be present in a particular context. Thus, an audio signal including a speech signal may be collected and processed. A context may be inferred, and a corresponding social graph may be identified. A set of potential speakers may be determined based on the social graph. The processed signal may then be compared to a restricted set of speech models, each speech model being associated with a potential speaker. By limiting the set of potential speakers, speakers may be more accurately identified.

In some embodiments, a method for identifying a speaker is provided. The method may include: accessing audio data comprising a speech signal, the audio data generated using a microphone on a mobile device; inferring a context of a user of the mobile device; identifying a social graph based at least partly on the inferred context, the social graph comprising a list of potential speakers; and identifying a speaker determined to have vocally contributed to the speech signal, the speaker identification based at least partly on the identified social graph. Inferring the context of the user may be based at least partly on a location of the user. The method may further include determining the location of the user at least partly based on GPS, WiFi or cellular signals received by the mobile device. Inferring the context of the user may be based at least partly on an environment of the user. The method may further include determining the environment at least partly based on BlueTooth or audio signals received by the mobile device. Inferring the context of the user may be based at least partly on an activity of the user. The method may further include determining the activity based at least partly on motion-sensor data, light-sensor data, or audio signals captured by the microphone on the device. Inferring the context of the user may be based at least partly on one or more of: email data, text message data, calendar data, social networking data and contact list data associated with the mobile device. Inferring the context of the user may be based at least partly on a call status and/or current-call details of the mobile device. Inferring the context of the user may be based at least partly on applications actively or inactively being used on the mobile device. Inferring the context of the user may be based at least partly on a time of day during which the audio data was collected. The audio data may include audio portions sampled in a privacy-sensitive manner such that spoken words cannot be reconstructed from the audio data. The method may further include storing a plurality of social graphs, each social graph being associated with a different context. The method may further include storing a plurality of speech models, wherein each speech model is associated with a potential speaker. The method may further include: storing a plurality of speech models, wherein each speech model is associated with a potential speaker; processing the accessed audio data; and comparing the processed audio data to a subset of the plurality of speech models, the subset being determined based at least partly on the identified social graph. The method may further include generating social graphs for one or more contexts, wherein generation of the social graphs is at least partly on one or more of: user location data, calendar data, email data, and social networking data. The identified social graph may include edge weightings for one or more edges of the one social graph. The edge weighting for each edge may correspond to a fraction of time the user spends interacting with a person associated with the edge. The method may further include, prior to identifying the social graph: capturing training audio data in each of a plurality of contexts; clustering the captured training audio data; and generating a plurality of social graphs based on the clustered audio data, wherein the generated social graph comprises one of the plurality of social graphs. The method may further include defining a plurality of potential contexts based at least partly on execution of a clustering algorithm. The identifying the speaker may include identifying a name of the speaker.

In some embodiments, an apparatus for recognizing a speaker is provided. The apparatus may include a mobile device comprising: a microphone configured to receive audio signals and convert the received audio signals into radio signals; and a transmitter configured to transmit the radio signals. The apparatus may also include one or more processors configured to: capture audio data from the microphone; infer a context of a user of the mobile device; identify a social graph based at least partly on the inferred context, the social graph comprising a list of potential speakers; and identify a speaker determined to have vocally contributed to the speech signal, the speaker identification based at least partly on the identified social graph. A remote server may include at least one of the one or more processors. The mobile device may include all of the one or more processors. The mobile device may include a display, and the one or more processors may be further configured to present the identification of the speaker on the display.

In some embodiments, a computer-readable medium is provided, the computer-readable medium containing a program which executes the steps of: accessing audio data comprising a speech signal, the audio data generated using a microphone on a mobile device; inferring a context of a user of the mobile device; identifying a social graph based at least partly on the inferred context, the social graph comprising a list of potential speakers; and identifying a speaker determined to have vocally contributed to the speech signal, the speaker identification based at least partly on the identified social graph. The program may further execute the step of: transforming the accessed audio data into a feature space. The program may further execute the step of: storing a plurality of social graphs, each social graph being associated with a different context. The program may further execute the steps of: storing a plurality of speech models, wherein each speech model is associated with a potential speaker; processing the accessed audio data; and comparing the processed audio data to a subset of the plurality of speech models, the subset being determined based at least partly on the identified social graph.

In some embodiments, a system for recognizing a speaker is provided. The system may include: means for accessing audio data comprising a speech signal (e.g., a transceiver and/or microphone); means for inferring a context (e.g., a present-state analyzer); means for identifying a social graph based at least partly on the inferred context (e.g., a context-to-social-graph mapper), the social graph comprising a list of potential speakers; and means for identifying a speaker determined to have vocally contributed to the speech signal, the speaker identification based at least partly on the identified social graph (e.g., a classifier and/or a speech-model-to-person mapper). The system may further include means for generating social graphs (e.g., a social-graph generator) for one or more contexts based at least partly on one or more of: user location data, calendar data, email data, and social networking data The identified social graph may include edge weightings for one or more edges of the one social graph. The system may further include means for presenting the identifying speaker to a user of the mobile device (e.g., a display).

BRIEF DESCRIPTION OF THE DRAWINGS

FIG. 1B is a diagram illustrating the capture of audio data according to an embodiment of the present invention.

FIG. 1C is a diagram illustrating the capture of audio data according to another embodiment of the present invention.

DETAILED DESCRIPTION

Methods, devices and systems are provided to improve identification of a person using speaker recognition. In some instances, a speaker is recognized by associating a received audio signal with one of a set of possible speakers. For example, an initial set of possible speakers may be defined, and one or more speech models may be associated with each possible speaker. A received signal may be processed in an attempt to associate the signal with one of the possible speakers.

A difficulty arises in that mobile devices frequently receive audio signals from a large number of speakers. Thus, recognizing a speaker may require comparing a given processed signal to a large number of control variables. Such analysis may require substantial computational processing and may be prone to frequent errors in recognition. Required processing power, computational time, and errors may be reduced if recognition of a speaker could be restricted to recognizing a speaker from a smaller set of possible speakers.

Thus, in some embodiments, a signal is recognized using a restricted set of control data. An initial control data set may be downsized to a restricted control data set by using a context. For example, a context (e.g., "work", "home", "party", "meeting", "car", "with family", etc.) may be inferred based on, e.g., a time of day, a location, a user activity, applications executing on a device, sensor data, surrounding noise, calendar events, email data, a call status, applications in use on a mobile device, user input, etc. Each of a plurality of contexts may be associated with a social graph. The social graph may identify a set of people who are likely to have provided a speech signal in the inferred context.. For one or more people associated with the social graph, the social graph may include a probability that a given speech signal originated with the person. The set itself may be defined based on this probability (e.g., such that a set includes all people with a signal probability greater than a threshold, such as 10%). The probability may be calculated without accounting for audio characteristics of the signal (e.g., there is a 10% probability that a speech signal received at home was from "sister.") Using the applicable social graph may thereafter aid in recognizing from whom the speech signal originated. More specifically, a recognition may include matching an audio signal to one of a smaller set of possible speakers.

Figure 1A:
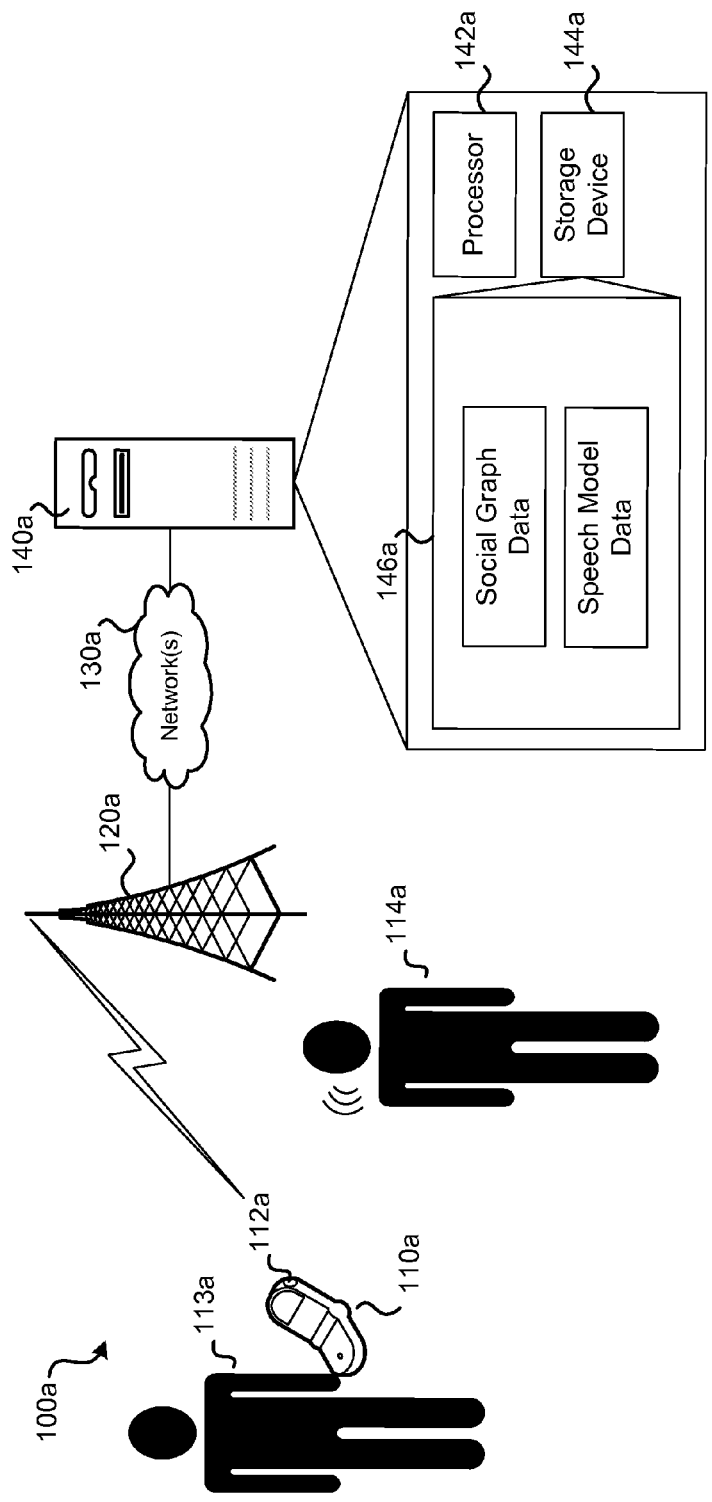
FIG. 1A illustrates an embodiment of an apparatus for the identifying one or more persons using social graphs, speech models, and user context information.

FIG. 1A illustrates an apparatus 100a for identifying one or more people according to one embodiment of the present invention. As shown in FIG. 1A, apparatus 100a can include a mobile device 110a, which may be used by a user 113a. A mobile device 110a can communicate with a remote server 140a via wireless network 120a and network(s) 130a. Mobile device 110a may include a transmitter configured to transmit radio signals, e.g., over a wireless network. Mobile device 110a can represent a cellular phone, a smart phone, or some other mobile computerized device, such as a personal digital assistant, tablet computer, laptop, handheld gaming device, digital camera, etc. Mobile device 110a, as shown in FIG. 1A, can contain microphone 112a. Microphone 112a can permit mobile device 110a to collect or capture audio data from the mobile device's surrounding physical environment (e.g., speech being spoken by person 114a).

Microphone 112a may be configured to convert sound waves into electrical or radio signals during select ("active") time periods. In some instances, whether microphone 112a is active depends at least partly on whether one or more programs or parts of programs are executing on mobile device 110a. For example, microphone 112a may be active only when a particular program is executed, indicating that mobile device 110a is in a call state. In some embodiments, microphone 112a is activated while mobile device 110a is on a call and when one or more independent programs are executed. For example, the user may be able to initiate a program to: set up voice-recognition speed dial, record a dictation, etc. In some embodiments, microphone 112a is activated automatically, e.g., during fixed times of the day, at regular intervals, etc.

In some embodiments, privacy sensitive microphone sampling can be used to ensure that no spoken words and/or sentences can be heard or reconstructed from captured audio data while providing sufficient information for speech detection purposes. For example, referring to FIG. 1B, a continuous audio stream in a physical environment can comprise a window 110b of audio data lasting $T_{window}$ seconds and having a plurality of audio portions or data segments. More specifically, the window can comprise N blocks 120b, each block 120b lasting $T_{block}$ seconds and comprising a plurality of frames 130b of $T_{frame}$ seconds each. A microphone signal can be sampled such that only one frame (with $T_{frame}$ seconds of data) is collected in every block of $T_{block}$ seconds. An example of parameter setting includes $T_{frame}$=50 ms and $T_{block}$=500 ms, but these settings can vary, depending on desired functionality. For example, frames can range from less than 30 ms to 100 ms or more, blocks can range from less than 250 ms up to 2000 ms (2 s) or more, and windows can be as short as a single block (e.g., one block per window), up to one minute or more. Different frame, block, and window lengths can impact the number of frames per block and the number of blocks per window. Note that frame capturing can be achieved by either continuously sampling the microphone signal and discarding (i.e. not storing) the unwanted components (e.g., 450 ms out of every 500 ms), or by turning the microphone off during the unwanted segment (e.g., turning the microphone off for 450 ms out of every 500 ms).

The resulting audio data 140b is a collection of frames that comprises only a subset of the original audio data. Even so, this subset can still include audio characteristics that can provide for a determination of an ambient environment and/or other contextual information of the audio data with no significant impact on in the accuracy of the determination. In some instances, the subset may also or alternatively be used to identify a speaker (e.g., once a context is inferred). For example, cepstral coefficients may be determined based on the subset of data and compared to speech models.

Figure 1D:
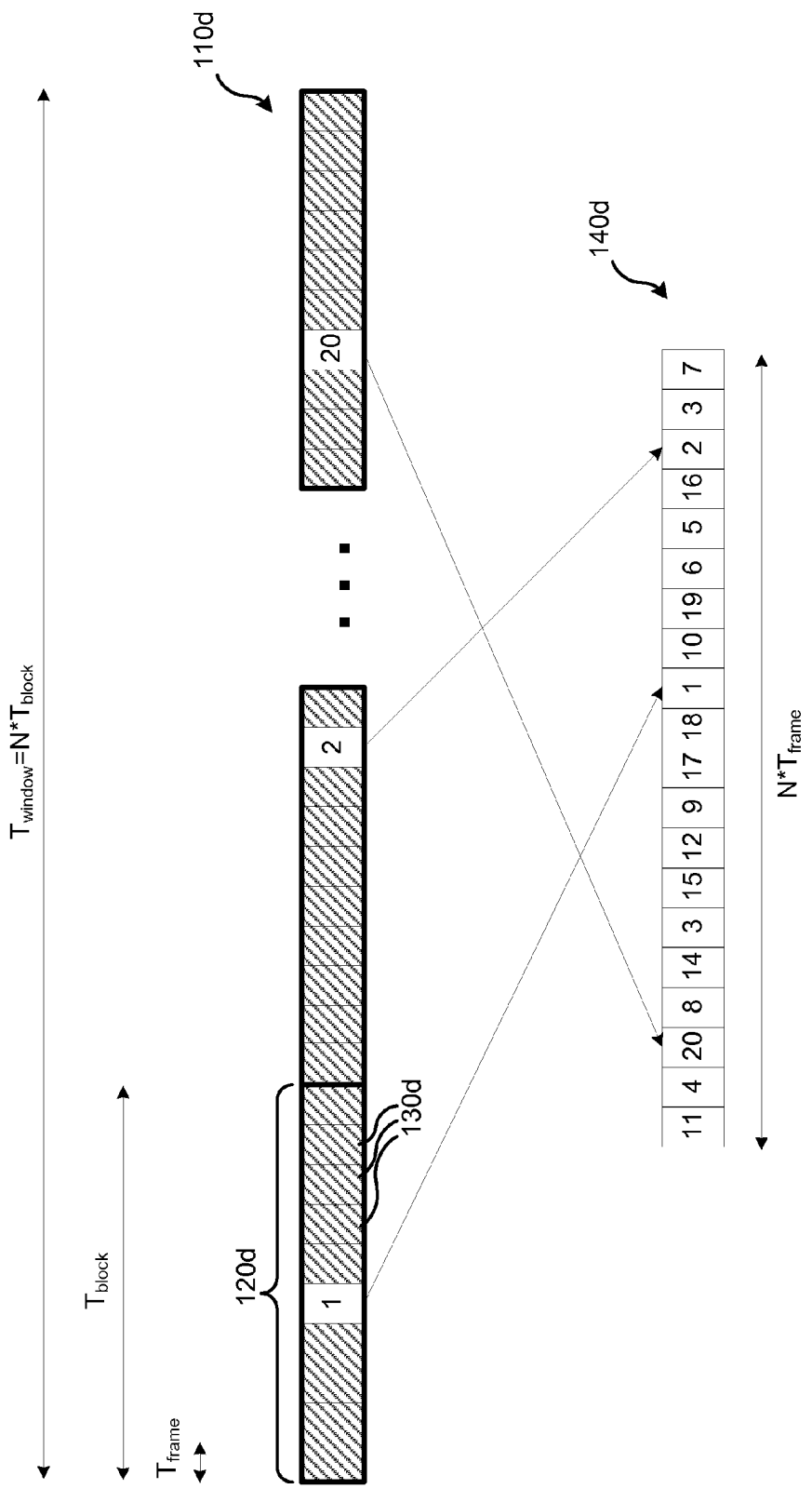
FIG. 1D is a diagram illustrating the capture of audio data according to still another embodiment of the present invention.

FIGS. 1C and 1D are similar to FIG. 1B. In FIGS. 1C and 1D, however, additional steps are taken to help ensure further privacy of any speech that may be captured. FIG. 1C illustrates how, for every window of $T_{window}$ seconds, the first frames of every block in a window can be randomly permutated (i.e. randomly shuffled) to provide the resultant audio data 140c. FIG. 1D illustrates a similar technique, but further randomizing the frame captured for each block. For example, where $T_{window}=10$ and $T_{block}=500$ ms, 20 frames of microphone data will be captured. These 20 frames then can be being randomly permutated. The random permutation can be computed using a seed that is generated in numerous ways (e.g., based on GPS time, based on noise from circuitry within the mobile device 110a, based on noise from microphone, based on noise from an antenna, etc.). Furthermore, the permutation can be discarded (e.g., not stored) to help ensure that the shuffling effect cannot be reversed.

Other embodiments are contemplated. For example, the blocks themselves may be shuffled before the frames are captured, or frames are captured randomly throughout the entire window (rather than embodiments limiting frame captures to one frame per block), etc. In some embodiments, all frames may be sampled and randomly permutated. In some embodiments, some or all frames may be sampled and mapped onto a feature space. Privacy-protecting techniques may enable processed data (e.g., incomplete frame sampling, permutated frames, mapped data, etc.) to be stored, and it may be unnecessary to store original audio data. It may then be difficult or impossible to back-calculate the original audio signal (and therefore a message spoken into the microphone) based on stored data.

Referring again to FIG. 1A, wireless network 120a can represent a cellular service provider's wireless network. Wireless network 120a can use one or more network(s) 130a to communicate with remote server 140a. Network(s) 130a can include one or more private networks, such as a corporate intranet, and/or one or more public networks, such as the Internet.

Remote server 140a can include processor 142a and storage device 144a. In some embodiments, remote server 140a can include other components not illustrated. Mobile device 110a may also include a processor and/or a storage device. Speech model data may be stored on storage device 144a and/or a storage device of mobile device 110a. Speech model data may include, e.g., raw audio signals, portions of audio signals, processed audio signals (e.g., normalized signals or filtered signals), feature-mapped audio signals (e.g., cepstral coefficients), parameters corresponding to speech model, parameters corresponding to a template, etc. A speech model associated with a speaker may include a set of parameters used to determine whether an unknown signal is likely to include a speech signal by the speaker. For example, a first speech model associated with Speaker 1 may include a specific power spectra template and a second speech model associated with Speaker 1 may include a set of audio-data parameters (e.g., amplitude variation, a clipping variable, etc.).

Social graph data may be stored on storage device 144a and/or a storage device of mobile device 110a. Social graph data may include, e.g., variables indicative of a social context (e.g., a time of day, a day of the week, a reception signal strength, a location, a GPS coordinate, a program being executed, a user input, etc.), people associated with a particular context (e.g., names, unique identifiers, etc.), a probability that a speech signal will have originated by a specific person given a context, etc.

Stored data can be used to identify a speaker proximate to mobile device 110a and/or its user. In certain embodiments, storage device 144a can store social graph data and speech model data for a number of different users. Illustratively, storage device 144a might store ten different social graphs and twenty different speech models for each of five different users.

Social graphs can be obtained in any suitable manner and through using any suitable form of data. Social graphs can be obtained through data obtained from a user's location, calendar, email, social networking profile, etc. As one example, a social graph may include speech models associated only or at least with people who a calendar indicates will or might be at a current event (e.g., a meeting). As another example, relationships may be inferred or determined based on a social networking profile, email data or text-messaging data (e.g., by analyzing defined relationships, email formality, time stamps of text messages or emails, etc.). People with particular relationships (e.g., work colleagues) may be represented with one or more speech models associated with a related context (e.g., work).

In some instances, a social graph is "learned." For example, speech signals may be monitored and captured. A context may be inferred, e.g., based on received data (e.g., audio data, GPS data, user-input data, time and day data, etc.). Captured speech signals may be clustered, such that one or more clusters are estimated to correspond to a unique speaker. Thus, for example, it may be learned that in Context A, Speakers 1-3 are likely to be present, and that in Context B, Speakers 1 and 4-6 are likely to be present. One or more speech models may be associated with one or more of the speakers. If a speech signal is received in Context B, speech model data associated with Speakers 1 and 4-6 may then be used to identify from whom the speech signal originated.

In some embodiments, social graphs can correspond to a user context. For example, a social graph consisting of a list of work colleagues can correspond to a "work" context. As another example, a social graph consisting of a user's family/household members can correspond to a "home" context. As yet another example, a social graph consisting of a list of friends (or a list of friends and all of their friends) that are attending a specific function can correspond to an "party" context.

In certain embodiments, social graphs that correspond to the different contexts of the user can have a nested structure. In these instances, if a user's context is defined at a low (e.g., more precise) level, the social graph may be much smaller—thereby making it easier for the server to accurately identify the speakers that are in proximity to the mobile device user. For example, as opposed to a high-level context of "party," a user context may be "John's party". In such a case, the corresponding social graph might be limited to a list of invited guests (or people that have checked themselves in to the party using a social networking tool), which may be much more specific than a list of all friends (or all friends and all of their friends). As another example, if a user's context is "a meeting at work," the corresponding social graph may consist only of work colleagues in the user's team, or alternatively consist only of meeting invitees.

According to some embodiments, social graphs with edge weightings can be utilized. In particular, each person represented in a social graph can be assigned a weighting. The weighting can represent the relative fraction of time the mobile device user spends interacting with that person. For example, if the user's context is "work," work colleagues on the user's team would be assigned higher weightings than people that are not on the user's team. Likewise the social graph corresponding to a user's friends would include weightings for close friends that are higher than weightings for distant friends. As another example, if a user is at a party with an RSVP list consisting of various levels of invitation acceptance, such as "Attending", "Maybe Attending", "Not Attending", "Not Replied", the invitees would be weighted accordingly on a corresponding social graph. More specifically, higher weights would be assigned to those people that have responded "Attending" than those that have responded "Maybe Attending". It should be appreciated that the weighting for a particular person with which a user interacts can change with the user's context. For instance, if the user is close friends with someone who happens to also be a work colleague but not a member of the same team, the person could have a higher weighting when the user's context is "party," than when the user's context is "work." As another example, a family member might receive a higher weighting when a user's context is "home" rather than "party."

Edge weightings can be used in any suitable manner to identify a speaker. For example, in some implementations, edge weightings can be treated as prior probabilities. Illustratively, suppose a Bayesian classifier is used. Let f(x) denote the feature vectors computed from an audio data vector x. Further, let P(s) (where s=1, . . . , S) denote the prior probabilities for the speakers in a social graph corresponding to a user's context. It should be noted that these prior probabilities sum to one, i.e.

$$\sum_{s=1}^{S} P(s) = 1.$$

Based on the computed feature vectors and prior probabilities, a speaker with the highest posterior probability can be selected using the following equation: $\tilde{s}=\mathrm{argmax}_{s \in [1, \ldots, S]} P(f(x)|s)P(s)$. In particular, embodiments can multiply the likelihood scores $P(f(x)|s)$ for each speaker s by the prior probability for that speaker P(s), and subsequently select the speaker with the highest result.

In some embodiments, mobile device 110a performs substantially all processing described herein. In some embodiments, remote server 140a performs some or substantially all processing described herein. Mobile device 110a can be configured to provide raw, intermediate or fully processed to remote server 140a. For example, mobile device 110a may transmit to remote server 140a: raw audio and/or speech data, privacy-sensitive audio and/or speech data, processed (e.g., filtered, transformed, normalized, etc.) audio and/or speech data, context variables, an inferred context, a list of possible speakers, an applicable social graph, one or more speech models (e.g., corresponding to a list of people in a social graph associated with an inferred context), etc. In some embodiments, speech models for a set of people with which a mobile device user most frequently associates are cached by mobile device 110a and/or remote server 140a. By caching speech models, a speaker may be identified more quickly and/or identification functionality can continue to be available even during periods when a processor is operating offline.

Examples of processes that can be used to identify one or more persons will now be described.

Figure 2:
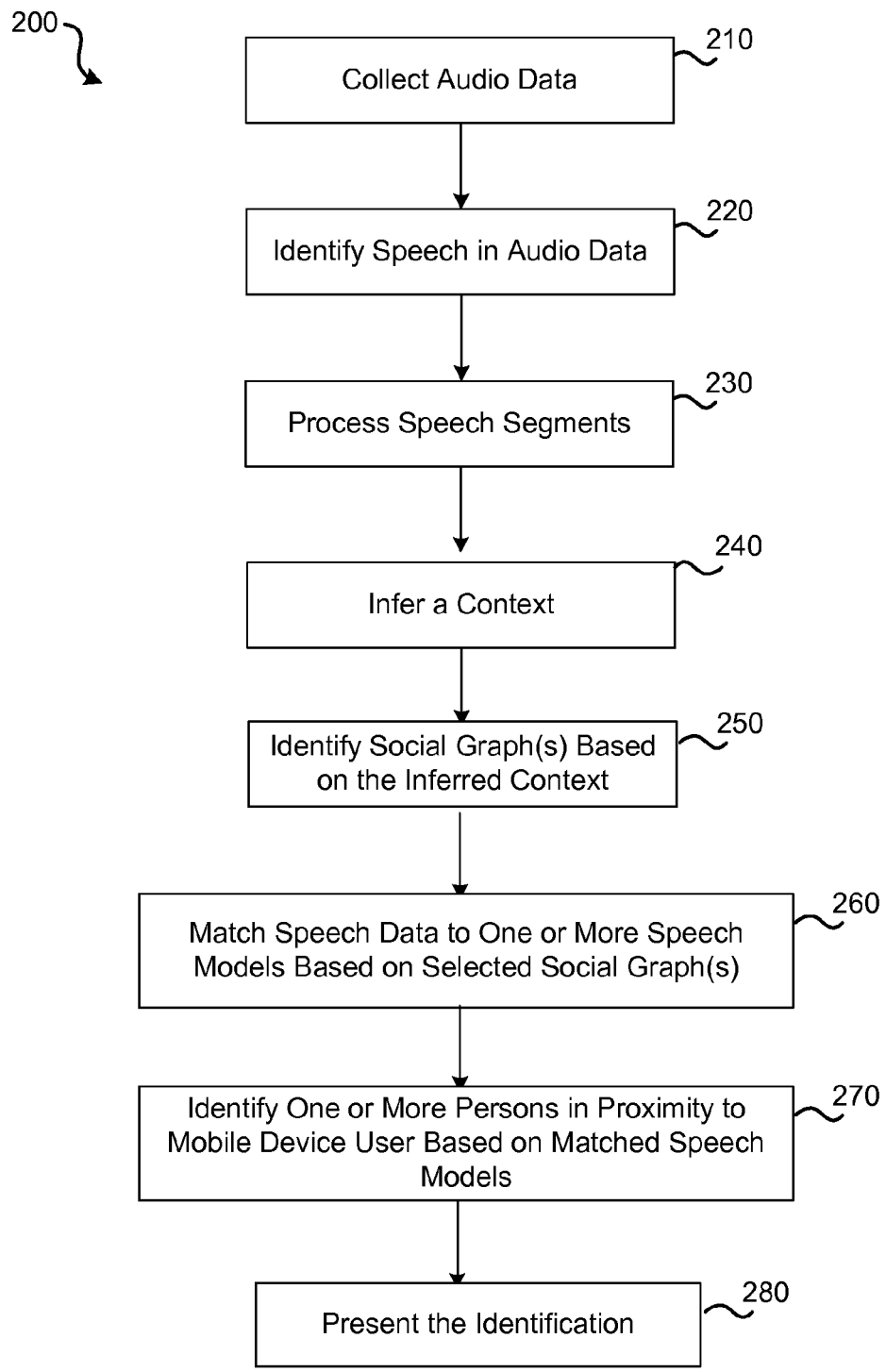
FIG. 2 is a flow diagram of a process for identifying one or more persons in proximity to a mobile device user.

FIG. 2 is a flow diagram of a process 200 for identifying one or more persons according to one embodiment. Part or all of process 200 can be performed by e.g., mobile device 110a and/or by remote server 140a.

Process 200 starts at 210 when mobile device 110a collects or gathers audio data from its surrounding physical environment (e.g., using a microphone and/or recorder on mobile device 110a). In some embodiments, mobile device 110a can collect the audio data using an embedded or connected microphone. According to some embodiments, mobile device 110a can be configured to use privacy sensitive microphone sampling in order to ensure that no spoken words and/or sentences can be heard or reconstructed from the collected audio data.

Audio data may be collected, e.g., continuously, regularly, or at discrete intervals. In some instances, audio data is always or sometimes collected when speech is detected. For example, the mobile device can be configured to execute a speech detection program. The speech detection program can be run in the background, and over the course of a day, determine when speech is present in the environment surrounding the mobile device. If speech is detected, audio signals can be recorded by the mobile device (e.g., using microphone 112a). In some embodiments, audio data is recorded, e.g., when an input (e.g., from a user) is received indicating that audio data is to be recorded or that a program is to be initiated. In some embodiments, audio signals are recorded when a volume of monitored sounds exceeds a threshold; when one or more particular programs or parts of programs (e.g., relating to a mobile device being engaged in a call) is executed; when a mobile device is engaged in a call; when a mobile device is transmitting a signal; etc.

At 220, segments in the audio data that includes speech are identified (e.g., by a speech detector). For example, a signal may be divided into a plurality of segments. Each segment may be characterized by one or more variables (e.g., cepstral coefficients). Analysis of the variables associated with each segment may enable an estimation as to whether the segment includes a speech signal.

At 230, speech segments are processed (e.g., by applying a filter, a transformation, a normalization, a noise-reduction algorithm, etc.). For example, feature vectors (e.g., including cepstral coefficients) may be computed for the speech segments. As further examples, speech segments may be filtered, normalized, etc. As yet further examples, speech segments may be sampled and/or permutated such that, e.g., spoken words cannot be reconstructed from the processed data.

At 240, a current context is inferred (e.g., by a present-state analyzer). A context may be inferred, e.g., based on sensor data received by mobile device 110a (e.g., sensing nearby Bluetooths, determined reception strength, received GPS signals, received cellular signals, received audio signals, or received WiFi signals), sensor data received by external sensors (e.g., sensing the time of day), prior user input (e.g., associated with a calendar event), stored text (e.g., email text or a text message), user-provided data (e.g., identifying a context), a social networking status, email data, text message data, calendar data, etc. In some instances, a current context may be inferred at least partly based on received audio data. For example, background noise characteristics, clarity of a received signal, or an identified particular type of signal (e.g., of a particular speaker or noise), may suggest that a user or device is in a particular context. In some embodiments, contexts are "learned." For example, data (such as any context-indicative data listed above) may be monitored and clustered. One or more clusters may be associated with a unique context identifier. In some instances, one or more contexts are named. In some instances, one or more contexts are not named and are identified, e.g., based on a unique (e.g., alphanumeric) identifier.

In some instances, inferring a context is based at least partly on a location. The context may be a location (e.g., an address, a portion of a city or a city) or the location may suggest that a user is in a context (e.g., a specific range of GPS coordinates may be associated with a "work" context). The location may be at least partly determined by the type, time or strength of signals received by of transmitted from a mobile device. For example, the location may be determined at least partly based on GPS, WiFi or cellular signals received by the mobile device.

In some instances, inferring a context is based at least partly on an environment (e.g., silence, many voice signals, loud background, many nearby people, many nearby computers, near a specific computer, or music). The environment may be determined based on, e.g., signals (e.g., BlueTooth or audio signals) received by the mobile device.

In some instances, inferring a context is based at least partly on an activity of a user (e.g., watching a movie, working on a computer, at a social event, running, etc.). The activity may be determined using sensor data, such as motion-sensor data, light-sensor data, received audio signals, etc. The activity may also be determined based on, e.g., email data, text-messaging data, calendar data or social networking data. For example, a "running" context may be determined when motion-sensor data indicates that the device is moving at about six miles per hour. As another example, a "social" context may be inferred when calendar data stored on the device or associated with a user of the device indicates that the user accepted an invitation from "John."

In some instances, inferring a context is based at least partly on a device-related status (e.g., a call status, current-call details, applications being actively or inactively used on the device, etc.). For example, an on-call status may be inferred when the device is engaged in a call. A social graph may then include, e.g., people in a contact list or a person associated with a phone number (e.g., in a contact list or public/private database) calling/being called by the device. As another example, when the device is executing a game application, the device may infer a non-work context.

At 250, at least one social graph is identified (e.g., using a context-to-social-graph mapper implementing a mapping algorithm) based at least partly on the inferred context. Illustratively, the context can indicate that a user or device is at "home." As a result, a social graph including the user's household members can be selected. The identified social graph may comprise a stored social graph. Each stored social graph may be associated with one or more contexts and may have been generated (e.g., by a social-graph generator) based at least partly on user location data, calendar data, email data, social networking data, received-signal data, etc. The identified social graph(s) may include features (e.g., weights) as described above.

The social graph(s) may have been constructed using any appropriate technique. For example, a social graph may have been constructed based on user inputs to mobile device 110*a* (e.g., identifying people likely to be present in particular contexts), electronic messages (e.g., emails, electronic invitations, text messages, etc.), data on social network sites, audio signals previously captured in an associated context, signals previously received by nearby mobile devices in an associated context, etc. As a specific example, it may be inferred that a user is at Mary's party because he accepted an electronic invitation to the party. A social graph associated with a Mary's-party context may include a list of all other people who publicly indicated (e.g., via a webpage) that they would also be attending the party. As another specific example, it may be inferred that a user is in Context A. A social graph may have been determined by capturing audio signals while the user was previously in Context A. The social graph may then indicate that, within ten minutes, there is a 50% probability of receiving a speech signal from Speaker 1, a 30% probability of receiving a speech signal from Speaker 2, and a 5% probability of receiving a speech signal from Speaker 3.

At 260, speech data (e.g., processed speech segments) can be matched to one or more speech models (e.g., using a classifier implementing a classification algorithm) based on the selected at least one social graph. In particular, at least some of the people represented in the selected social graph can each be associated with a corresponding speech model. Each model can be compared to the speech data, and one or more speech models that match the speech data can be determined. For example, one or more models represented in the identified social graph may be associated with a speech model comprising a number of cepstral coefficients. Processed speech data may also include a number of cepstral coefficients. The speech data may be matched to a speech model having the most similar cepstral coefficients. In one embodiment, a speech model comprises and/or consists of a probability of receiving a speech signal from a speaker given a context. Speech models may include, e.g., a Gaussian Mixture Model or Hidden Markov Model.

At 270, one or more persons in proximity to the mobile device user can be identified (e.g., using a speech-model-to-person mapper implementing a mapping algorithm) based at least partly on the results of the matching at 260. Identification of the one or more persons may include identifying the one or more persons, e.g.: by name, by a unique identifier, by a phone number, by an e-mail address, by an online ID, by an audio characteristic, by an audio sample, by a relationship, etc. In some instances, one or more probabilities associated with the identification are determined. For example, it may be determined that there was a 90% probability that a speech signal originated from Speaker 1, a 5% probability that the speech signal originated from Speaker 2, and a 5% probability that the speech signal originated from an unknown speaker. The probability may be based on a confidence associated with inferring the context and/or a confidence associated with identifying a person given the inferred context.

At 280, the identification of the one or more persons may be presented. In some instances, the identification is communicated to a user of mobile device 110*a*. For example, the identification(s) may be displayed on a display of mobile device 110*a*. In some instances, a communication (e.g., a text message, a voice message, or an e-mail message) comprising the identification(s) is sent to the user. The identification may be published on a website (e.g., a social networking website). The identification may be used to update a status of the user on a social networking website.

In some embodiments, mobile device 110*a* performs all of process 200. In some embodiments, remote server 140*a* performs at least part of process 200. In the latter instances, it may be necessary for data to be transmitted by mobile device 110a (e.g., via wireless network 120 and/or network(s) 130) and received by remote server 140a. Transmitted data may include, e.g., raw or processed audio data, speech data (e.g., data including the computed feature vectors), speech model data, context-related data, social graph data, etc. In some instances, mobile device 110a performs 210-240 and 280 locally. Speech data and the inferred context are the transmitted to remote server 140a. Remote server then performs 250-270. Information regarding one or more persons that are in proximity to the mobile device and/or its use may then be transmitted from remote server 140a (e.g., via wireless network 120 and/or network(s) 130) and received by mobile device 110a. Identification of the one or more persons can be based on the speech data and user context previously transmitted to remote server 140a. Remote server 140a may store, e.g., social graph data and speech models. In some embodiments, the social graph data can include one or more social graphs with which the speech models can be associated. For example, each social graph can include representations for one or more persons. Each of the representations can be associated with a speech model that represents the voice of a person.

Figure 3:
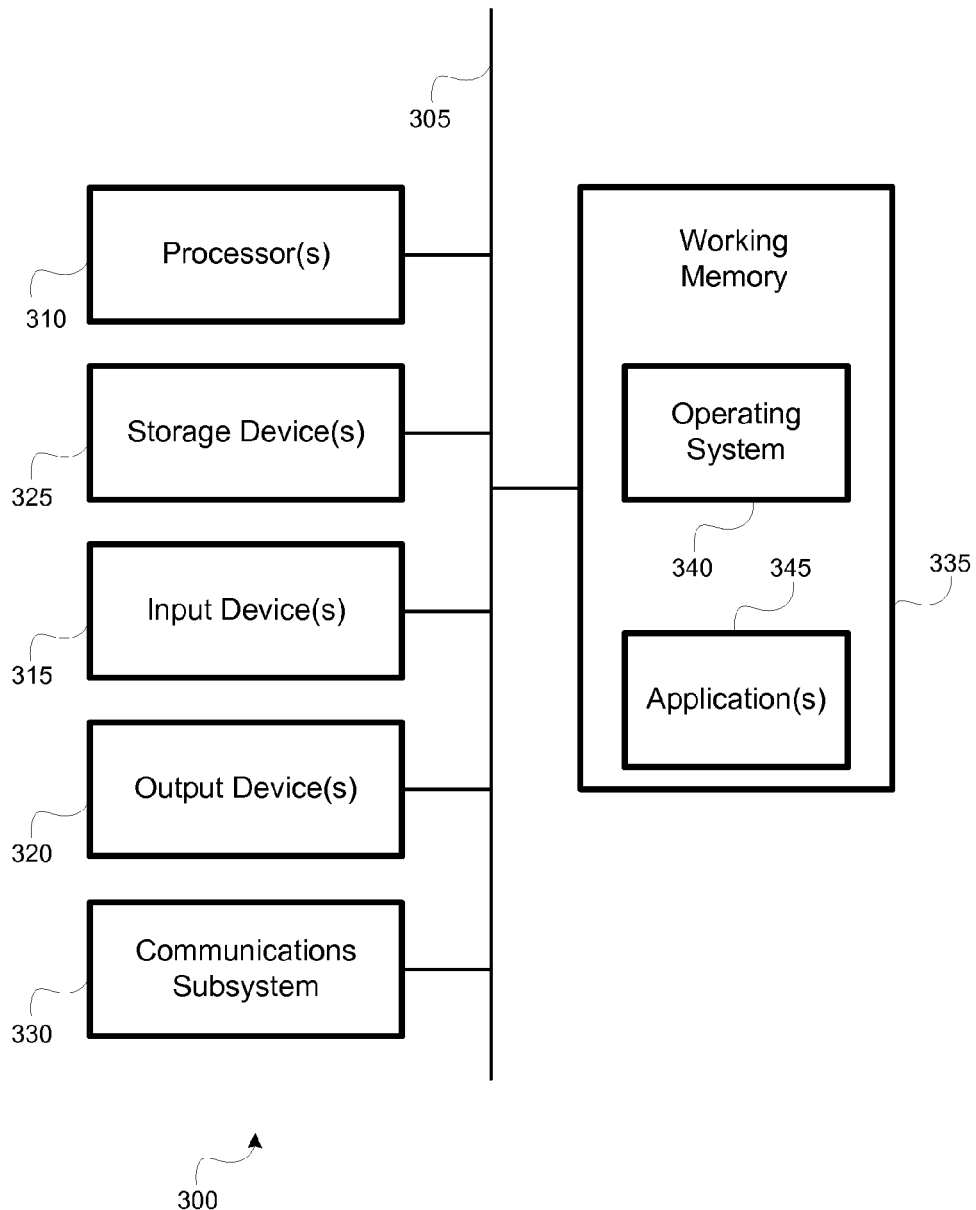
FIG. 3 illustrates an embodiment of a computer system.

A computer system as illustrated in FIG. 3 may be incorporated as part of the previously described computerized devices. For example, computer system 300 can represent some of the components of the mobile devices and/or the remote computer systems discussed in this application. FIG. 3 provides a schematic illustration of one embodiment of a computer system 300 that can perform the methods provided by various other embodiments, as described herein, and/or can function as the remote server 140a and/or mobile device 110a. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), other computer systems, and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 325 described above. In some cases, the storage medium might be incorporated within a computer system, such as the system 300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 300, various computer-readable media might be involved in providing instructions/code to processor(s) 310 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for identifying a speaker with a mobile device, the method comprising:
   capturing, via a microphone on the mobile device, audio data comprising a speech signal;
   inferring, via the mobile device, a context of a user of the mobile device;
   identifying, via the mobile device, a social graph based at least partly on the inferred context, the social graph comprising a list of potential speakers; and
   identifying, via the mobile device, a speaker determined to have vocally contributed to the speech signal, the speaker identification based at least partly on the identified social graph.

2. The method of claim 1, wherein inferring the context of the user is based at least partly on a location of the user.

3. The method of claim 2, further comprising determining the location of the user at least partly based on GPS, WiFi or cellular signals received by the mobile device.

4. The method of claim 1, wherein inferring the context of the user is based at least partly on an environment of the user.

5. The method of claim 4, further comprising determining the environment at least partly based on BlueTooth or audio signals received by the mobile device.

6. The method of claim 1, wherein inferring the context of the user is based at least partly on an activity of the user.

7. The method of claim 6, further comprising determining the activity based at least partly on motion-sensor data, light-sensor data, or audio signals captured by the microphone on the mobile device.

8. The method of claim 1, wherein inferring the context of the user is based at least partly on one or more of email data, text message data, calendar data, social networking data and contact list data associated with the mobile device.

9. The method of claim 1, wherein inferring the context of the user is based at least partly on a call status and/or current-call details of the mobile device.

10. The method of claim 1, wherein inferring the context of the user is based at least partly on applications actively or inactively being used on the mobile device.

11. The method of claim 1, wherein inferring the context of the user is based at least partly on a time of day during which the audio data was collected.

12. The method of claim 1, wherein the audio data includes audio portions sampled in a privacy-sensitive manner such that spoken words cannot be reconstructed from the audio data.

13. The method of claim 1, further comprising storing a plurality of social graphs, each of the plurality of social graphs being associated with a different context.

14. The method of claim 1, further comprising storing a plurality of speech models, wherein each speech model is associated with a potential speaker.

15. The method of claim 1, further comprising:
   storing a plurality of speech models, wherein each speech model is associated with a potential speaker;
   processing the accessed audio data; and
   comparing the processed audio data to a subset of the plurality of speech models, the subset being determined based at least partly on the identified social graph.

16. The method of claim 1, further comprising generating social graphs for one or more contexts, wherein generation of the social graph is at least partly on one or more of: user location data, calendar data, email data, and social networking data.

17. The method of claim 1, wherein the identified social graph includes edge weightings for one or more edges of the identified social graph.

18. The method of claim 17, wherein the edge weighting for each edge corresponds to a fraction of time the user spends interacting with a person associated with the edge.

19. The method of claim 1, further comprising, prior to identifying the social graph:
accessing training audio data, the audio data corresponding to a plurality of contexts;
clustering the accessed audio data; and
generating a plurality of social graphs based on the accessed training audio data,
wherein the generated social graph comprises one of the plurality of social graphs.

20. The method of claim 1, further comprising defining a plurality of potential contexts based at least partly on execution of a clustering algorithm.

21. The method of claim 1, wherein the identifying the speaker comprises identifying a name of the speaker.

22. A mobile device for identifying a speaker, the mobile device comprising:
a microphone; and
one or more processors coupled to the microphone and configured to:
capture, via the microphone, audio data comprising a speech signal;
infer a context of a user of the mobile device;
identify a social graph based at least partly on the inferred context, the social graph comprising a list of potential speakers; and
identify a speaker determined to have vocally contributed to the speech signal, the speaker identification based at least partly on the identified social graph.

23. The mobile device of claim 22, wherein a remote server comprises at least one of the one or more processors.

24. The mobile device of claim 22, wherein the mobile device comprises all of the one or more processors.

25. The mobile device of claim 22, wherein the mobile device comprises a display, and wherein the one or more processors are further configured to present the identification of the speaker on the display.

26. A computer-readable medium containing a program which executes the steps of:
capture, via a microphone on a mobile device, audio data comprising a speech signal;
inferring a context of a user of the mobile device;
identifying a social graph based at least partly on the inferred context, the social graph comprising a list of potential speakers; and
identifying a speaker determined to have vocally contributed to the speech signal, the speaker identification based at least partly on the identified social graph.

27. The computer-readable medium of claim 26, wherein the program further executes the step of: transforming the accessed audio data into a feature space.

28. The computer-readable medium of claim 26, wherein the program further executes the step of: storing a plurality of social graphs, each social graph being associated with a different context.

29. The computer-readable medium of claim 26, wherein the program further executes the steps of:
storing a plurality of speech models, wherein each speech model is associated with a potential speaker;
processing the accessed audio data; and
comparing the processed audio data to a subset of the plurality of speech models, the subset being determined based at least partly on the identified social graph.

30. A system for identifying a speaker, the system comprising:
means for capturing, via a microphone on a mobile device, audio data comprising a speech signal;
means for inferring a context;
means for identifying a social graph based at least partly on the inferred context, the social graph comprising a list of potential speakers; and
means for identifying a speaker determined to have vocally contributed to the speech signal, the speaker identification based at least partly on the identified social graph.

31. The system of claim 30, further comprising means for generating social graphs for one or more contexts based at least partly on one or more of: user location data, calendar data, email data, and social networking data.

32. The system of claim 30, wherein the identified social graph includes edge weightings for one or more edges of the one social graph.

33. The system of claim 30, further comprising means for presenting the identification of the speaker to a user of the mobile device.

* * * * *